(12) United States Patent
Budweil

(10) Patent No.: US 11,433,703 B2
(45) Date of Patent: Sep. 6, 2022

(54) VEHICLE HAVING VARIABLE TRACK

(71) Applicant: TRIGGO S.A., Lomianki (PL)

(72) Inventor: Rafal Budweil, Cracow (PL)

(73) Assignee: TRIGGO S.A., Lomianki (PL)

(*) Notice: Subject to any disclaimer, the term of this patent is extended or adjusted under 35 U.S.C. 154(b) by 335 days.

(21) Appl. No.: 16/420,222

(22) Filed: May 23, 2019

(65) Prior Publication Data

US 2019/0275834 A1  Sep. 12, 2019

Related U.S. Application Data

(63) Continuation of application No. PCT/EP2017/079241, filed on Nov. 15, 2017.

(30) Foreign Application Priority Data

Nov. 24, 2016  (EP) ..................... 16461574

(51) Int. Cl.
*B60B 35/10* (2006.01)
*B62D 21/14* (2006.01)
(Continued)

(52) U.S. Cl.
CPC .......... *B60B 35/1036* (2013.01); *B60B 35/10* (2013.01); *B60B 35/1018* (2013.01);
(Continued)

(58) Field of Classification Search
CPC . B60B 35/10; B60B 35/1018; B60B 35/1036; B60B 35/1045; B60B 35/1072; B60B 35/109; B62D 21/14; B62D 31/003; B62D 61/06; B62D 61/065; B60G 2300/122; B60G 2300/40
See application file for complete search history.

(56) References Cited

U.S. PATENT DOCUMENTS 2,150,833 A * 3/1939 Hockett ............... B60K 7/0007
310/67 R
3,370,668 A * 2/1968 Goodacre ............ B60K 17/046
180/253
(Continued)

FOREIGN PATENT DOCUMENTS

DE  102009052470 A1 * 6/2010 ............. F16D 51/00
WO  WO-9911507 A1 * 3/1999 ........... B62D 31/003
(Continued)

*Primary Examiner* — Jason R Bellinger
(74) *Attorney, Agent, or Firm* — Mark M. Friedman

(57) ABSTRACT

A vehicle having a front axle with a pair of front wheels having a track width adjustable between a wide track and a narrow track; a rear axle with at least one rear wheel; a steering wheel configured to control the turn of the rear wheel when the front wheels are set to the narrow track; track width control configured to change the track width of the front wheels and to change the wheel base between the front axle and the rear axle such that for the wide track of the front wheels the wheel base is longer than for the narrow track of the front wheels; a locking mechanism configured to lock the track width; wherein each of the front wheels is connected to a dedicated front wheel motor for driving that front wheel and to a dedicated front wheel brake for braking that front wheel.

12 Claims, 9 Drawing Sheets

(51) Int. Cl.
 *B62D 31/00* (2006.01)
 *B62D 61/06* (2006.01)

(52) U.S. Cl.
 CPC ........... *B62D 21/14* (2013.01); *B62D 31/003* (2013.01); *B62D 61/065* (2013.01); *B60G 2300/122* (2013.01); *B60G 2300/40* (2013.01)

(56) References Cited

U.S. PATENT DOCUMENTS

| | | | |
|---|---|---|---|
| 4,717,164 | A | 1/1988 | Levavi |
| 5,927,424 | A | 7/1999 | Van Den Brink et al. |
| 6,902,022 | B2 | 6/2005 | Mathukia |
| 2005/0061565 | A1* | 3/2005 | Mizutani .............. B60K 7/0007 180/65.51 |
| 2006/0170171 | A1 | 8/2006 | Pedersen |
| 2007/0199748 | A1* | 8/2007 | Ross .................... B60K 7/0007 180/65.51 |

FOREIGN PATENT DOCUMENTS

| | | |
|---|---|---|
| WO | 9950128 | 10/1999 |
| WO | 0214086 | 2/2002 |
| WO | 2006112732 | 10/2006 |
| WO | 2008020861 | 2/2008 |
| WO | 2011144574 | 11/2011 |

\* cited by examiner

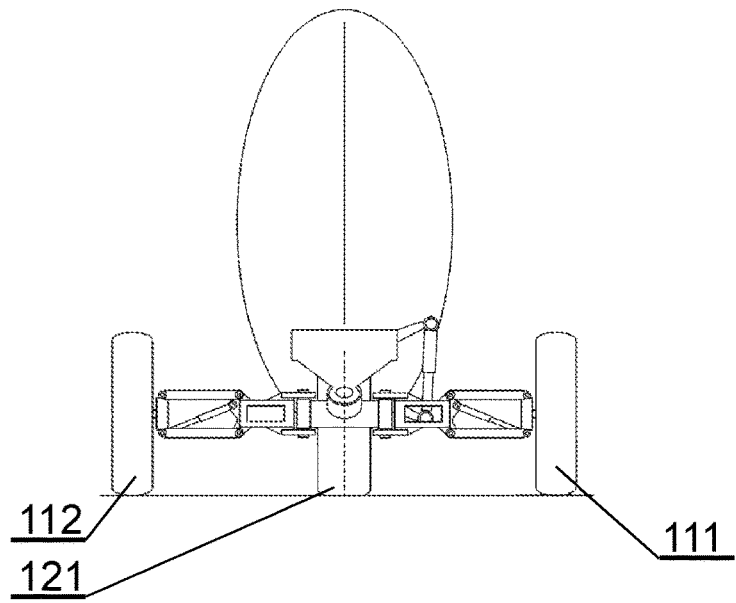
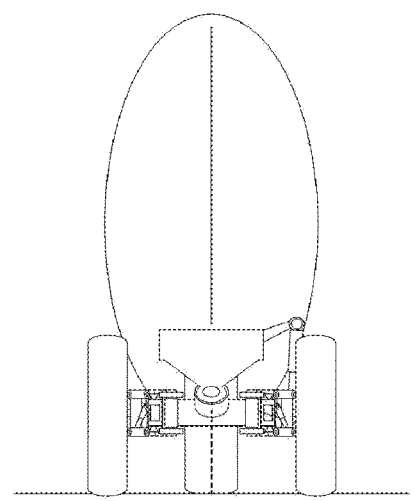
Fig. 2AFig. 2B
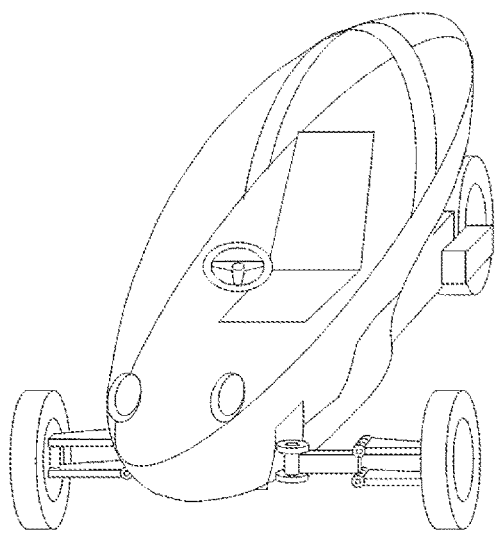
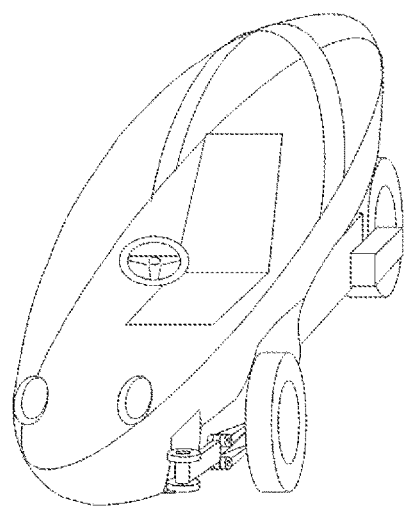
Fig. 3AFig. 3B

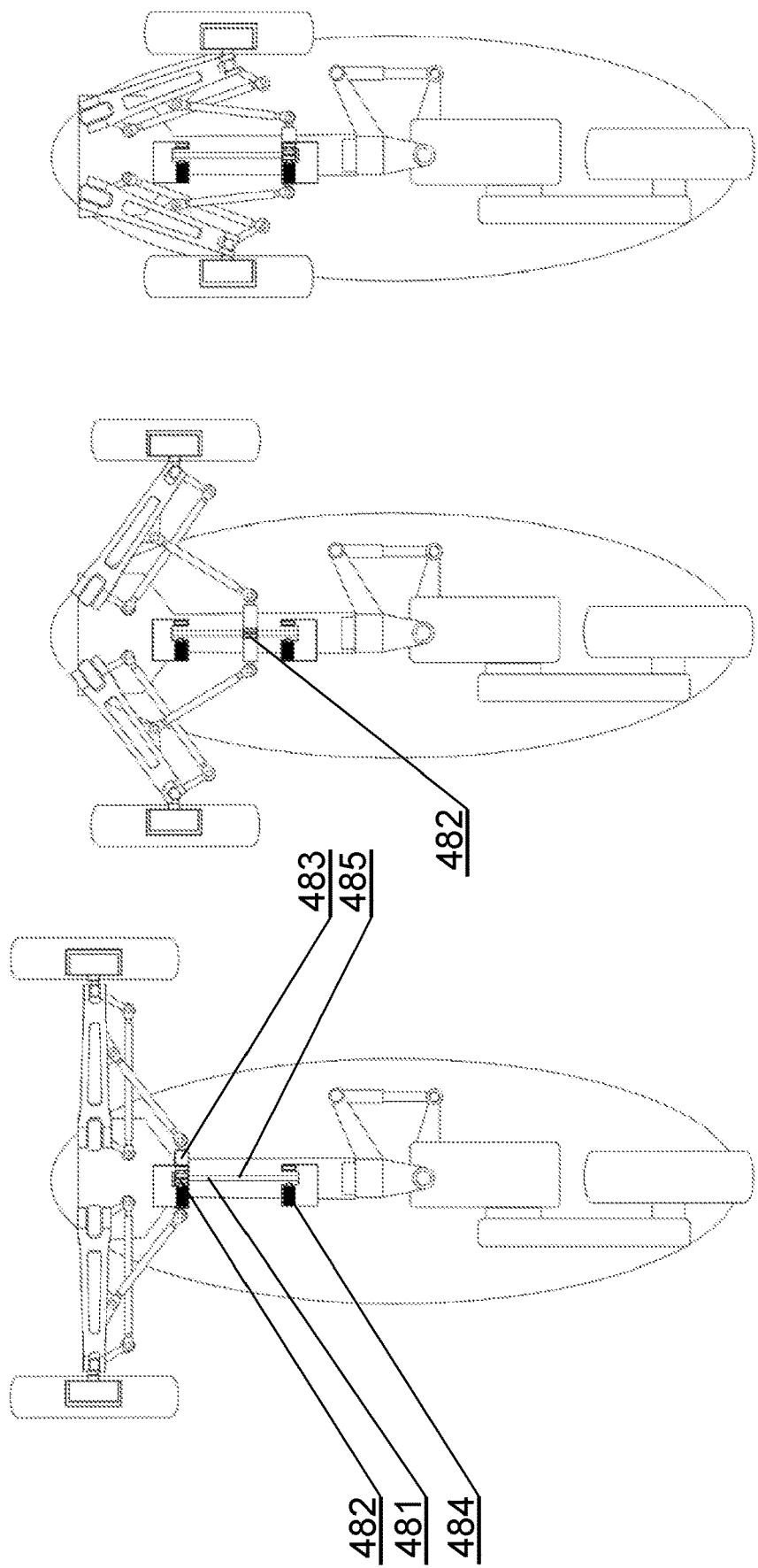

VEHICLE HAVING VARIABLE TRACK

TECHNICAL FIELD

The invention relates to vehicles with a variable track.

BACKGROUND ART

There are continuous attempts made to enhance the maneuverability and stability of vehicles.

For example, variable track axles are known to facilitate the use of vehicles in different environments, adjustment of vehicle aerodynamics at different speeds or adjustment of vehicle stability at different driving conditions. There are also known three-wheeled vehicles with a tiltable frame for increasing the driving capabilities of the vehicle at higher speeds.

The disadvantage of these vehicles is that they occupy relatively a lot of space when parked and/or have limited steering capabilities at low speeds due to wide track or low turning radius.

In addition, these vehicles require complex and thus heavy and expensive systems for operating the variable-width suspension.

SUMMARY OF THE INVENTION

Certain embodiments of the invention provide a vehicle which can be driven in an easy and stable manner at high speeds, while allowing high maneuvering capabilities at low speeds and requiring little parking space, while at the same time being characterized by a simple and economic system for operating the variable width suspension, which draws efficiency from synergies between the suspension and propulsion systems.

There is disclosed a vehicle comprising: a front axle with a pair of front wheels having a track width adjustable between a wide track and a narrow track; a rear axle with at least one rear wheel; steering means configured to control the turn of the rear wheel when the front wheels are set to the narrow track; track width control means configured to change the track width of the front wheels and to change the wheel base between the front axle and the rear axle such that for the wide track of the front wheels the wheel base is longer than for the narrow track of the front wheels; a locking mechanism configured to lock the track width; wherein each of the front wheels is connected to a dedicated front wheel motor for driving that front wheel and to a dedicated front wheel brake for braking that front wheel.

In some embodiments, the track width control means is configured to change the track width of the front wheels by controlling the front wheel motors and the front wheel brakes.

In some embodiments, the front wheel motors are electric motors.

In some embodiments, the front wheel motors is integrated with the front wheel brakes.

In some embodiments, the front wheel motors is integrated with the front wheel axles.

In some embodiments, the at least one rear wheel is driven by a rear wheel motor.

In some embodiments, the rear wheel motor may have a higher power than each of the front wheel motors.

In some embodiments, the rear axle with the at least one rear wheel is a dead axle.

In some embodiments, the locking mechanism is movable and configured to lock at predefined locking points which are fixed still with respect to the vehicle chassis.

The locking mechanism may comprise a latch configured to be coupled with pins.

The locking mechanism may comprise a pin configured to be coupled with latches.

The locking mechanism may comprise a magnetic element configured to be coupled with electromagnets.

In some embodiments, the locking mechanism is fixed still with respect to the vehicle chassis and configured to lock the pivotable wishbone pairs.

BRIEF DESCRIPTION OF DRAWINGS

The invention is shown by means of exemplary embodiments on a drawing, in which:

FIG. 2A shows a front view of the vehicle in a wide track configuration in accordance with an embodiment of the invention;

FIG. 2B shows a front view of the vehicle in a narrow track configuration in accordance with an embodiment of the invention;

FIG. 3A shows a perspective visualization of the vehicle in a wide track configuration in accordance with an embodiment of the invention;

FIG. 3B shows a perspective visualization of the vehicle in a narrow track configuration in accordance with an embodiment of the invention;

FIG. 7A shows a top view of a fourth embodiment of a chassis of the vehicle in a wide track configuration in accordance with an embodiment of the invention;

FIG. 7B shows a top view of the fourth embodiment of a chassis of the vehicle during a transition configuration in accordance with an embodiment of the invention;

FIG. 7C shows a top view of the fourth embodiment of a chassis of the vehicle in a narrow track configuration in accordance with an embodiment of the invention;

DETAILED DESCRIPTION OF THE INVENTION

Figure 1A:
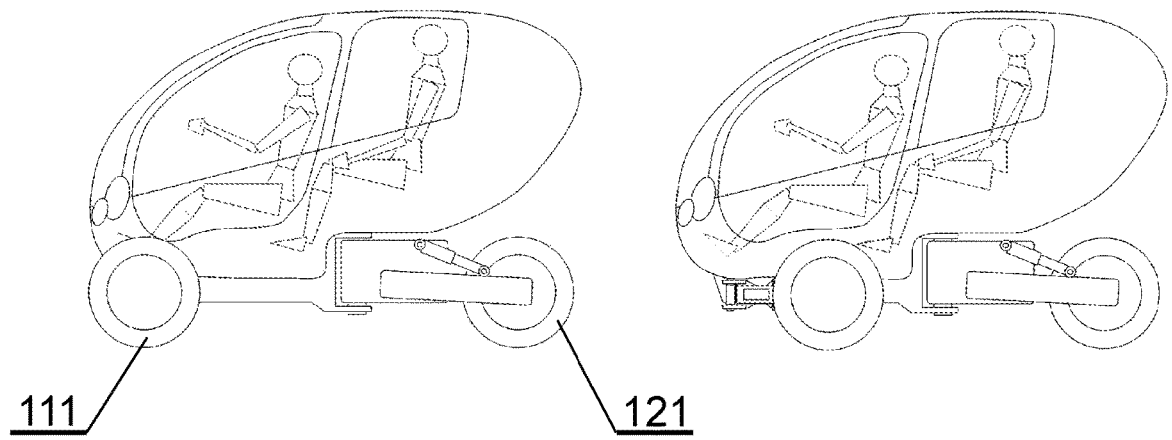
FIG. 1A shows side views of different types of vehicles according to an embodiment of the invention in a wide track configuration, corresponding to a high speed driving mode and in a narrow track configuration, corresponding to a low speed parking mode.
Figure 1B:
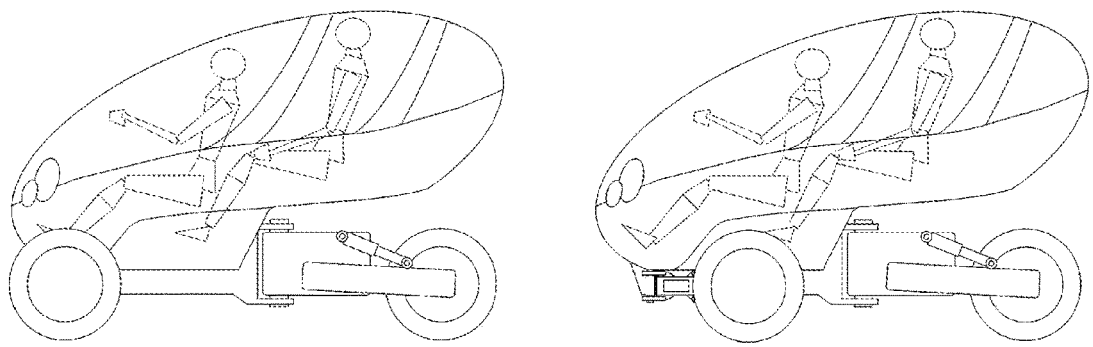
FIG. 1B shows side views of different types of vehicles according to an embodiment of the invention in a wide track configuration, corresponding to a high speed driving mode and in a narrow track configuration, corresponding to a low speed parking mode.
Figure 1C:
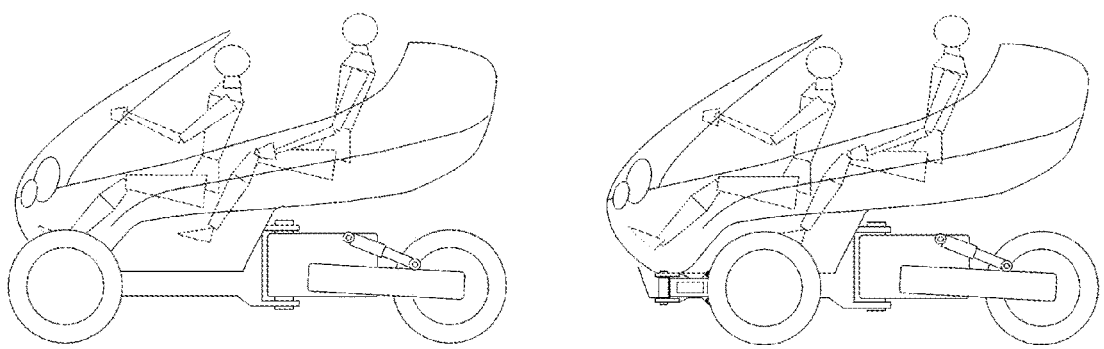
FIG. 1C shows side views of different types of vehicles according to an embodiment of the invention in a wide track configuration, corresponding to a high speed driving mode and in a narrow track configuration, corresponding to a low speed parking mode.

The vehicle according to the invention is shown in side views on FIGS. 1A-1C in a wide track configuration, corresponding to a high speed driving mode, and in a narrow track configuration, corresponding to a low speed parking mode. FIGS. 2A and 2B show a front view of the vehicle in a wide track and a narrow track configuration, respectively. FIGS. 3A and 3B show a perspective view of the vehicle in a wide track and a narrow track configuration, respectively. Preferably, the vehicle is a passenger vehicle for one or two persons, having a width of about 1 m in the narrow track configuration and a length of about 2-3 m. FIG. 1A shows a typical passenger transport vehicle with a closed boot portion, FIG. 1B shows a transport vehicle with a transparent boot portion and FIG. 1C shows an open-roof recreational transport vehicle. The vehicle is preferably a three-wheeled vehicle having a front axle with a pair of front wheels 111, 112 and a rear axle with a rear wheel 121. However, in certain embodiments, the vehicle may have more axles and/or wheels on each axle. The front wheels 111, 112 have a track width adjustable between a wide track, as shown in FIGS. 2A and 3A and a narrow track as shown in FIGS. 2B and 3B. For the wide track of the front wheels 111, 112, the wheel base, i.e. the distance between the front wheels axle and the rear wheel axle, is longer than for the narrow track of the front wheels 111, 112, as seen in FIG. 3A compared to FIG. 3B.

Preferably, in the wide track configuration, the track width of the front wheels equals at least 150% of the track width in the narrow track configuration, i.e. it is substantially wider.

Preferably, in the wide track configuration, the wheel base equals at least 120% of the wheel base in the narrow track configuration, i.e. it is substantially longer.

Such structure allows increasing the stability of the vehicle at higher speeds by setting the front wheels to a wide track and extending the wheel base, while maintaining narrow vehicle dimensions to allow parking in narrow spaces and increasing maneuverability at low speeds, by setting the front wheels to a narrow track and shortening the wheel base.

Figure 4A:
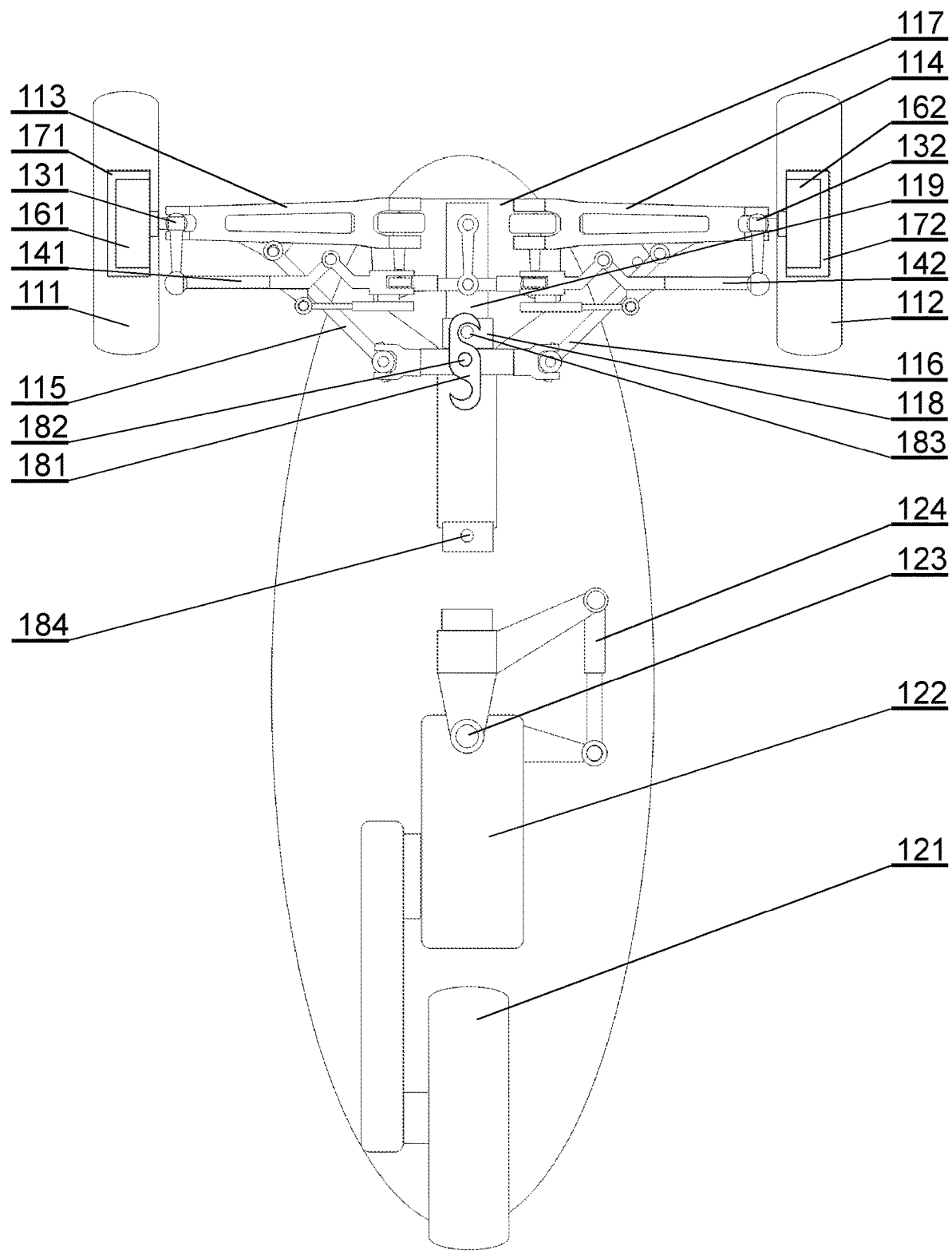
FIG. 4A shows a top view of a first embodiment of a chassis of the vehicle in a wide track configuration in accordance with an embodiment of the invention.
Figure 4B:
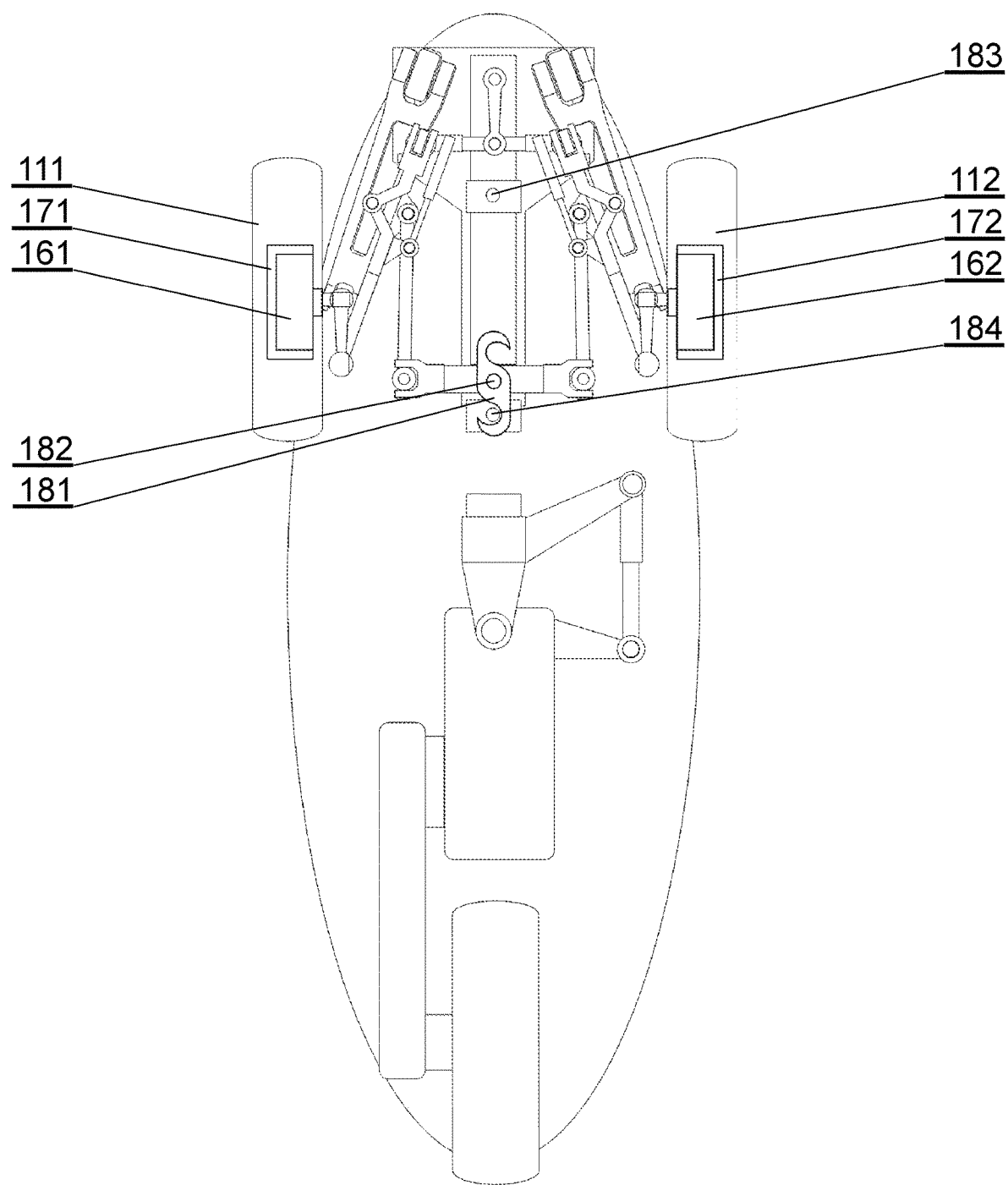
FIG. 4B shows a top view of the first embodiment of a chassis of the vehicle in a narrow track configuration in accordance with an embodiment of the invention.

FIGS. 4A and 4B show a top view of a first embodiment of a chassis of the vehicle in a wide track and in a narrow track configuration.

The vehicle chassis comprises a front axle, which is a split axle with a pair of front wheels 111, 112 having a track width adjustable between a wide track, as shown in FIG. 4A, and a narrow track, as shown in FIG. 4B. In a simple embodiment, the front wheels may be set to one of the wide or narrow track only. In a more elaborate embodiment, the front wheels may be set to a plurality of positions between the wide track and the narrow track, e.g. depending on the desired speed or comfort. In one embodiment, the track-adjustable front wheels are non-turnable and only the rear wheel is turnable to allow directional steering of the vehicle. In another embodiment, when the front wheels 111, 112 are set to the wide track, the front wheels 111, 112 are turnable around individual axes, defined by steering knuckle bearings 131, 132, to allow directional steering of the vehicle at higher speeds via the front wheels. When the front wheels are set to the narrow track, they are non-turnable and the vehicle is directionally steered by turning of the rear wheel. The non-turnable configuration of the front wheels 111, 112 may be activated electrically, e.g. by the central processing unit of the vehicle, or mechanically, by disconnecting or blocking the steering means of the front wheels 111, 112. Due to the fact that the front wheels 111, 112 are non-turnable when set to the narrow track, the front wheels 111, 112 may be brought very close to the vehicle bodywork, without the need to provide extra space for the turn of the wheels in the bodywork, thereby achieving particularly narrow width of the vehicle, as shown in FIGS. 2B and 3B.

The track width of the front wheels 111, 112 is changed by track width control means, which can be configured to change the wheel base between the front axle and the rear axle such that for the wide track of the front wheels 111, 112 the wheel base is longer than for the narrow track of the front wheels 111, 112.

According to certain embodiments of the invention, the track width is controlled by use of front wheel motors 161, 162 and front wheel brakes 171, 172, assigned individually to each of the front wheels 111, 112, as well as a locking mechanism 181 configured to lock the track width to a particular configuration. When change of the track width to a wider track is desired, the locking mechanism 181 is unlocked to enable displacement of the elements of the front suspension and the front wheel motors 161, 162 are governed to apply additional propulsion force onto the wheels 111, 112, which results in extension of the variable width suspension. When change of the track width to a narrower width is required, additional braking force is applied to the wheels 111, 112 by the front wheel brakes 171, 172 and the wheels 111, 112 force the variable width suspension to retract. When the desired position is reached, the locking mechanism 181 locks the elements of the variable width suspension and prevents the suspension from any extending, or retracting movement.

The "additional propulsion force" as indicated above is understood as a force necessary to extend the track width. This force may be dependent on the current speed and track width of the vehicle and may be calculated by an electronic controller of the track width control means according to predetermined equations defined for the particular type of the vehicle and elements of the suspension. The same applies in an equivalent manner to the "additional braking force". In order to keep the speed of the vehicle unchanged while changing the track width, the rear wheel can be employed as well. For example, in order to avoid acceleration while extending the track width, or even to reduce the overall vehicle speed while extending the track width, a braking force can be applied to the rear wheel. On the other hand, in order to avoid braking while reducing the track width, a driving force can be applied to the rear wheel (in an embodiment wherein the rear wheel is a driven by a motor).

The front wheel motors 161, 162 are preferably mounted directly in the axles of the front wheels. They are preferably electric motors.

The front wheel brakes 171, 172 can be standard brakes. Alternatively, the functionality of the brakes 171, 172 can be provided by the front wheel motors 161, 162, which can generate both propulsion and braking force. Therefore, the brake 171 or 172 and the motor 161 or 162 may form a single component of the system.

In the embodiment presented, the locking mechanism 181 is presented as a latch pivotable about a pivot axis 182, that can be forced by a spring (not visible on the drawing) to the alignment as shown in FIGS. 4A, 4B and may pivot about the axis 182 by a counter-force (from an actuator (not shown) or another spring, not shown) generated by the track width control means. The locking mechanism 181 is configured to lock about locking points 183, 184 (which can be also called anchoring points) to lock the track width at the wide track (FIG. 4A) and at the narrow track (FIG. 4B). In other embodiments, more predefined locking points may be defined.

The track width control means may comprise wishbone pairs 113, 114 connected to the front wheels 111, 112, each wishbone pair 113, 114 connected pivotally at one point to a central frame 117 and at another point to one end of a push-pull rod 115, 116, the other end of which is pivotally connected with an element 118 movable along a linear guide 119, such that its movement controls the change of the wheel base and the track width of the front wheels 111, 112. The central linear guide 119 is particularly useful for change of the track width when the vehicle moves with low speed. The central linear guide 119 can be used as an element that supports the control of the track width control means, in addition to the front wheel motors 161, 162 and the front wheel brakes 171, 172.

Another embodiment of track width control means may comprise, instead of the central linear guide 119, variable-length steering rods 141, 142 which change their effective length temporarily for time of retraction or extension of the track of the front wheels 111, 112. Increasing the length of the steering rod 141, 142 causes both front wheels 111, 112 to be turned towards the central axis of the vehicle, which during movement of the vehicle is pushing the wheels towards the center of the vehicle and narrowing the track. Shortening the steering rods 141, 142 causes both front wheels 111, 112 to be turned away from the central axis of the vehicle, and causes simultaneous movement of the front wheels 111, 112 outside, thereby widening their track. The steering rods 141, 142 can be used as an element that supports the control of the track width control means, in addition to the front wheel motors 161, 162 and the front wheel brakes 171, 172.

The track width control means may also comprise both the variable-length steering rods 141, 142 and the central guide 119, in addition to the front wheel motors 161, 162 and the front wheel brakes 171, 172.

In another embodiment, the track width control means may comprise only the front wheel motors 161, 162 and the front wheel brakes 171, 172 to control the track width.

Alternatively, apart from the double-wishbone suspension described above, other types of suspension can be used, such as a swingarm suspension or a MacPherson suspension, providing an individual axis of rotation for each wheel.

The vehicle chassis further comprises a rear axle with a rear wheel 121. The rear wheel 121 is turnable, for example by a linear actuator 124, around an axis defined by a bearing 123 offset from the centre of the rear wheel 121 by a distance larger than the radius of the rear wheel 121, which facilitates maneuvering of the vehicle. If the front wheels are turnable, the rear wheel 121 can be blocked when the front wheels 111, 112 are set to the wide track, so as to steer the vehicle only via the front wheels 111, 112 when the vehicle drives at higher speeds.

The rear axle may also be a drive axle of the vehicle, coupled with a rear wheel motor 122. In such a case, the front wheel motors 161, 162 can be low-power motors used only to generate additional propulsion force necessary to adjust the track width. In other words, the motor 122 driving the rear wheel 121 may have a higher power than each of the front wheel motors 161, 162. In other embodiments, the front wheel motors 161, 162 can be higher-power motors used also to generate propulsion force for driving the vehicle, in addition to the propulsion force generated by the rear axle motor 122. In yet another embodiment, the rear axle can be a dead axle and the vehicle can be driven only by the front wheel motors 161, 162. The vehicle further comprises steering means, e.g. a steering wheel, not shown in the drawing for simplicity, configured to control the turn of the rear wheel 121. In the embodiment wherein the front wheels are turnable, the same steering means may be also used to control the front wheels 111, 112 when the front wheels 111, 112 are set to the wide track. In a particular embodiment, the steering means may be configured to control the turn of the front wheels 111, 112 when the front wheels 111, 112 are set to the wide track and to control the turn of the rear wheel 121 when the front wheels 111, 112 are set to the narrow track. The term "turn" is to be understood as the turn of the wheels around a non-horizontal axis, preferably around a substantially vertical axis. In another embodiment, the turn of the front wheels 111, 112 and the rear wheel 121 may be controlled simultaneously, when the front wheels 111, 112 are not set to the narrow track. In another embodiment only rear wheel 121 is controlled irrespective of the track of the front wheels 111, 112. The steering means can be coupled and decoupled with the front wheels 111, 112 and the rear wheel 121 in any conventional mechanical or electrical manner.

The front wheels are used for directional steering when in wide track configuration. This can be achieved by known means, for example such as described in the PCT application WO2011144574. The principles of operation of the turning of the front wheels and of the rear wheel are equivalent to that described with reference to FIGS. 5, 6 and 7 of the PCT application WO2011144574. Other embodiments of the chassis of the vehicle can be employed as well, such as for example the chassis of the embodiment of FIGS. 8 and 9, or the chassis of the embodiment of FIGS. 10 and 11A-11B, or the chassis of the embodiment of FIGS. 14A-14C as presented in the PCT application WO2011144574.

Figure 5C:
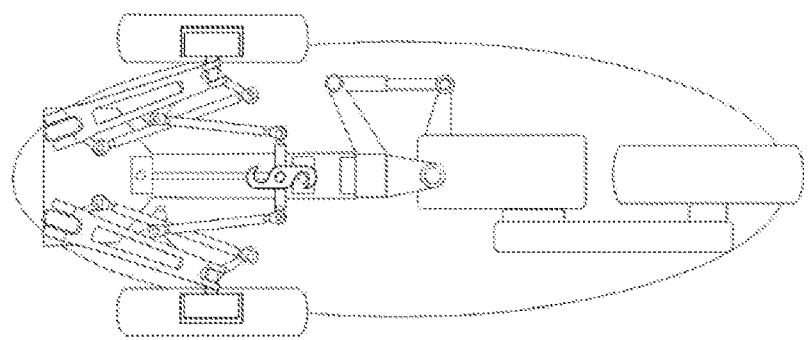
FIG. 5C shows a top view of the second embodiment of a chassis of the vehicle in a narrow track configuration in accordance with an embodiment of the invention.
Figure 5B:
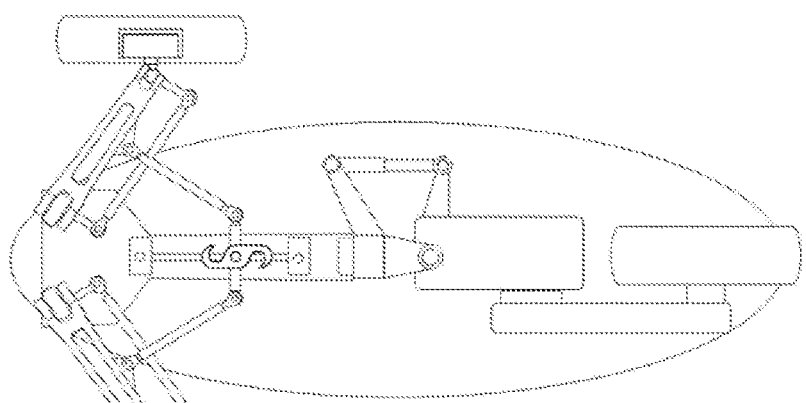
FIG. 5B shows a top view of the second embodiment of a chassis of the vehicle during a transition configuration in accordance with an embodiment of the invention.
Figure 5A:
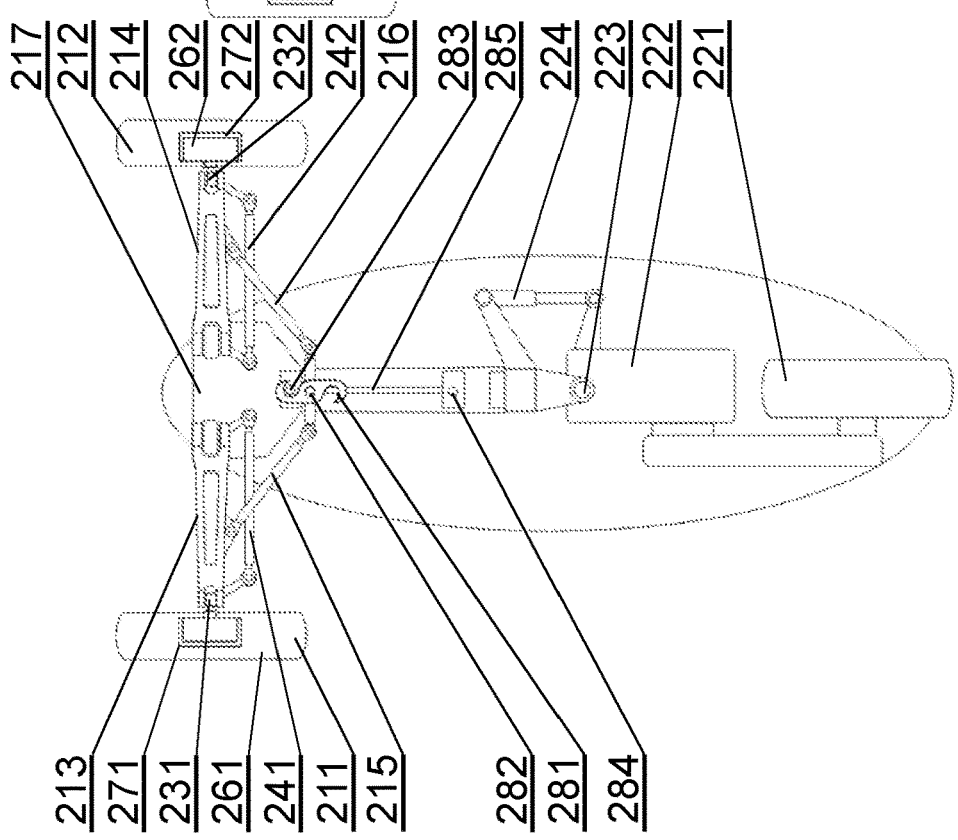
FIG. 5A shows a top view of a second embodiment of a chassis of the vehicle in a wide track configuration in accordance with an embodiment of the invention.

FIGS. 5A-5C show a top view of a second embodiment of a chassis of the vehicle in a wide track configuration, during a transition and in a narrow track configuration. The elements numbered 2xx are equivalent to elements numbered 1xx of the first embodiment, unless described as different below. For example, elements 211-217, 221-224, 231-232, 261-262, 271-272, and 282 are equivalent to elements 111-117, 121-124, 131-132, 161-162, 171-172, and 182 of the first embodiment. The principle of operation of the second embodiment is equivalent to that of the first embodiment, unless described as different below.

The second embodiment differs from the first embodiment by employing a different configuration of individual steering rods 241, 242.

The locking latch 281 is movable by a linear actuator 285 between the locking points 283, 284.

Figure 6C:
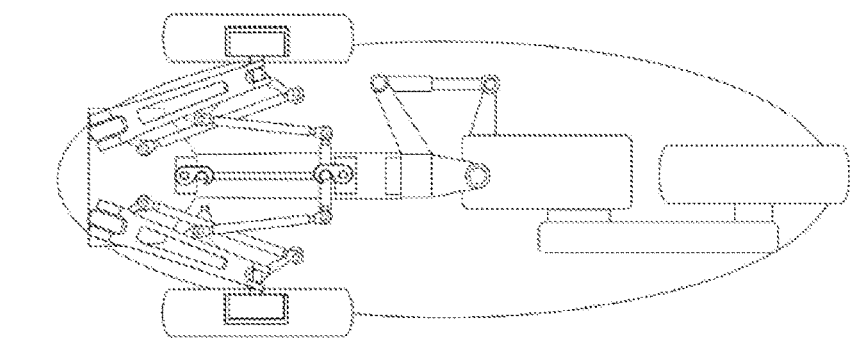
FIG. 6C shows a top view of the third embodiment of a chassis of the vehicle in a narrow track configuration in accordance with an embodiment of the invention.
Figure 6B:
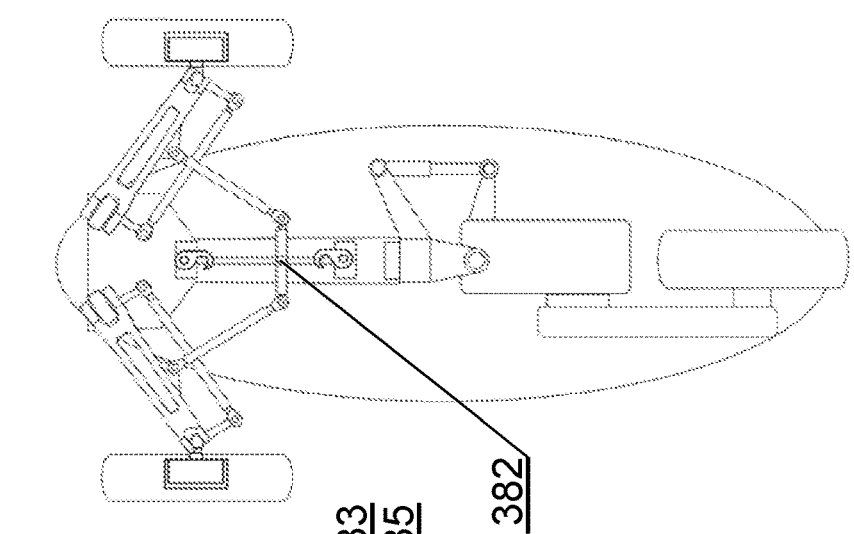
FIG. 6B shows a top view of the third embodiment of a chassis of the vehicle during a transition configuration in accordance with an embodiment of the invention.
Figure 6A:
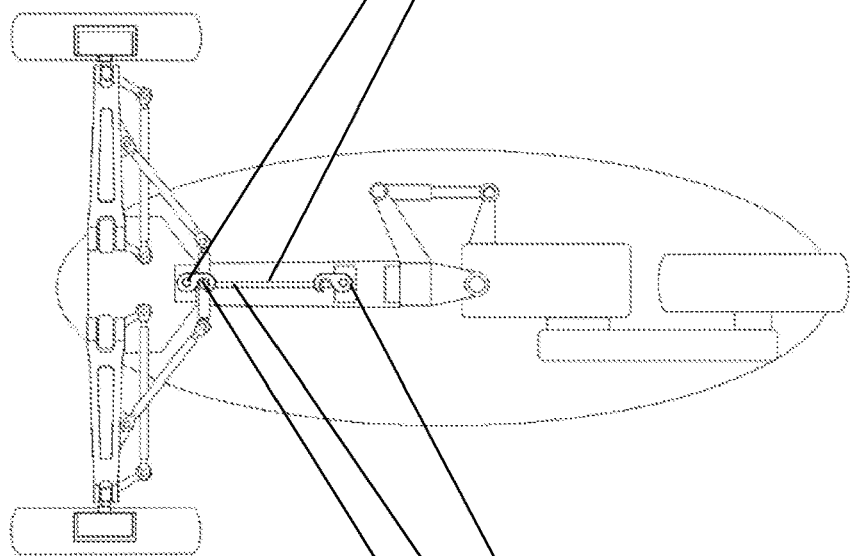
FIG. 6A shows a top view of a third embodiment of a chassis of the vehicle in a wide track configuration in accordance with an embodiment of the invention.

FIGS. 6A-6C show a top view of a third embodiment of a chassis of the vehicle in a wide track configuration, during a transition and in a narrow track configuration. For clarity, the elements corresponding to the elements of FIG. 2 have not been indicated by reference numerals. The principle of operation of the third embodiment is equivalent to that of the embodiments presented previously, unless described as different below.

The third embodiment differs from the other embodiments by employing a different locking mechanism. The locking mechanism comprises a pin 381 movable (on axis 382) by a linear actuator 385 between the locking points 383, 384. At the locking points, pivotable latches are installed, that can be forced by a spring (not visible on the drawing) to the alignment as shown in the drawing and may pivot about the axes 383, 384 by a counter-force (from an actuator (not shown) or another spring, not shown) generated by the track width control means. The locking mechanism is configured to lock the pin 381 about the locking latches at the locking points 383, 384 (which can be also called anchoring points) to lock the track width at the wide track (FIG. 6A) and at the narrow track (FIG. 6B).

FIGS. 7A-7C show a top view of a fourth embodiment of a chassis of the vehicle in a wide track configuration, during a transition and in a narrow track configuration. For clarity, the elements corresponding to the elements of FIG. 2 have not been indicated by reference numerals. The principle of operation of the fourth embodiment is equivalent to that of the embodiments presented previously, unless described as different below.

The fourth embodiment differs from the other embodiments by employing a different locking mechanism. The locking mechanism comprises a magnetic element 481 movable (on axis 482) by a linear actuator 485 between the locking points 483, 484. At the locking points 483, 484, electromagnets are installed that are controllable by the track width control means. The locking mechanism is configured to lock the magnetic element 481 by the electromagnets at the locking points 483, 484 (which can be also called anchoring points) to lock the track width at the wide track (FIG. 7A) and at the narrow track (FIG. 7B).

Figures 8A, 8B, 8C:
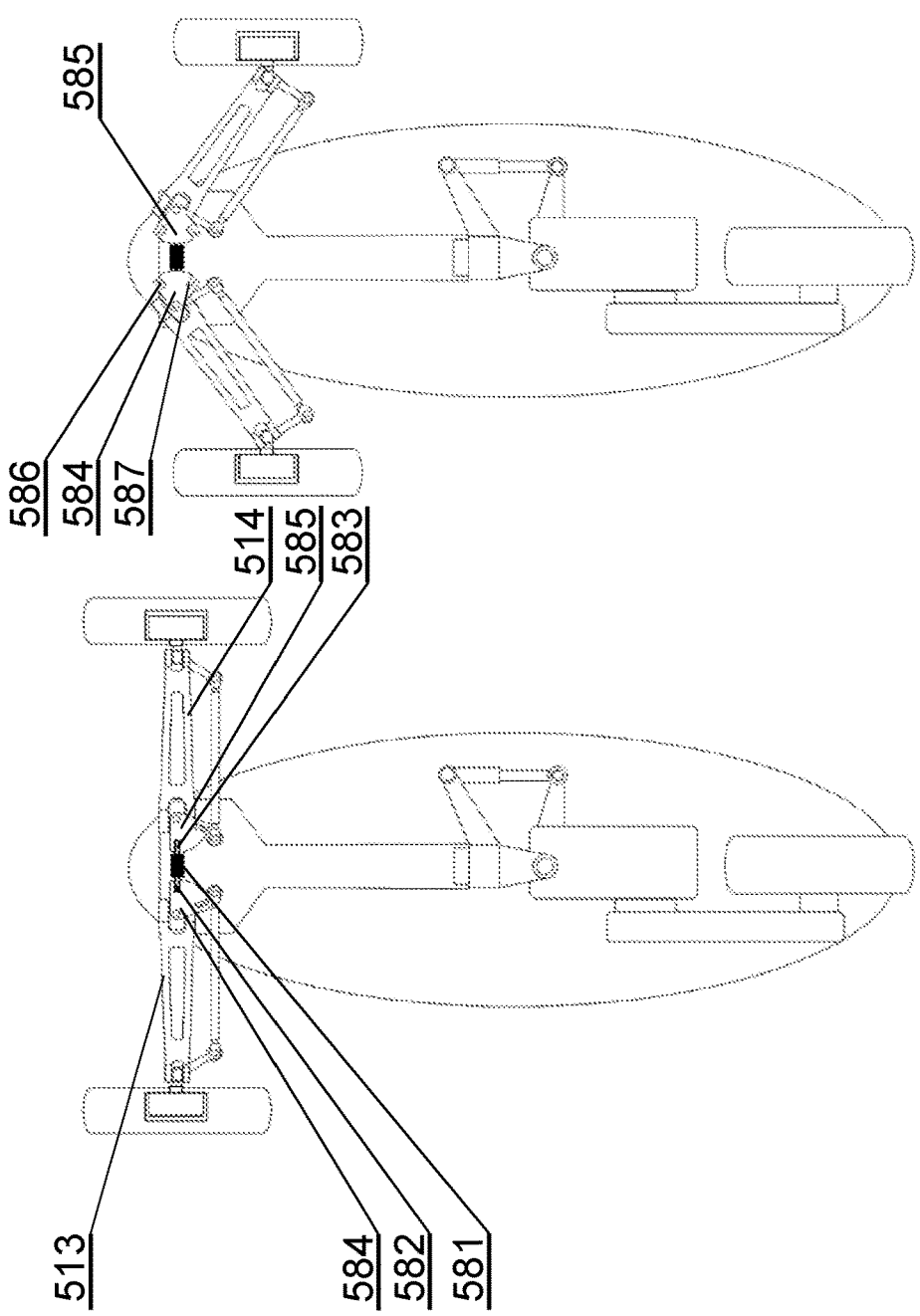
FIG. 8A shows a top view of a fifth embodiment of a chassis of the vehicle in a wide track configuration in accordance with an embodiment of the invention.
FIG. 8B shows a top view of a fifth embodiment of a chassis of the vehicle during a transition configuration in accordance with an embodiment of the invention.
FIG. 8C shows a top view of a fifth embodiment of a chassis of the vehicle in a narrow track configuration in accordance with an embodiment of the invention.

FIGS. 8A-8C show a top view of a fifth embodiment of a chassis of the vehicle in a wide track configuration, during a transition and in a narrow track configuration. For clarity, the elements corresponding to the elements of FIG. 2 have not been indicated by reference numerals. The principle of operation of the fifth embodiment is equivalent to that of the embodiments presented previously, unless described as different below.

The fifth embodiment differs from the other embodiments by employing a different locking mechanism. The locking mechanism comprises a still element 581 with two protruding pins 582, 583. The position of the pins 582, 583 can be controllable by the track width control means or other elements, such as springs mounted inside the still element 581. The wishbone pairs 513, 514, which are pivotable at their ends, are rigidly coupled with semi-circular discs 584, 585, each having a pair of with apertures 586, 587. The apertures 586, 587 are configured to receive the protruding pins 582, 583 and thereby to lock the discs 584, 585 and thereby the wishbone pairs 513, 514 in a narrow track position (FIG. 7A) or in a wide track position (FIG. 7B). More apertures can be defined in order to lock the chassis in other positions, between the narrow and wide track, if desired.

The vehicle according to the above embodiments may be operated in the following way. When the vehicle is to be driven at high speed, the front wheels may be set to the wide track and the vehicle can be controlled via the steering means configured to control the turn of the front wheels and/or of the rear wheel. Such "driving mode" provides good stability for the vehicle. When the vehicle is to be parked at a narrow space or driven slowly in space-constrained conditions, the front wheels may be set to the narrow track and the vehicle can be controlled via the steering means configured to control the turn of the rear wheel. Such "parking mode" provides narrow dimensions of the vehicle and good maneuvering capabilities. Therefore, the vehicle can be easily parked in narrow parking spaces. When the wheel base shortens for a narrower front track width, the turning radius decreases and the maneuvering capabilities are further increased.

The operation of both the track width control means and the steering means may be controlled by a common selector to be activated by the vehicle driver. The selector may be set to the "parking mode" or to the "driving mode". The selector can be a dedicated switch on the vehicle dashboard. Optionally, the selector can be coupled with a gear lever, wherein the "parking mode" can be coupled with a dedicated position of the gear lever or the reverse gear position and the "driving mode" can be coupled with the position indicating a forward gear.

Figure 9:
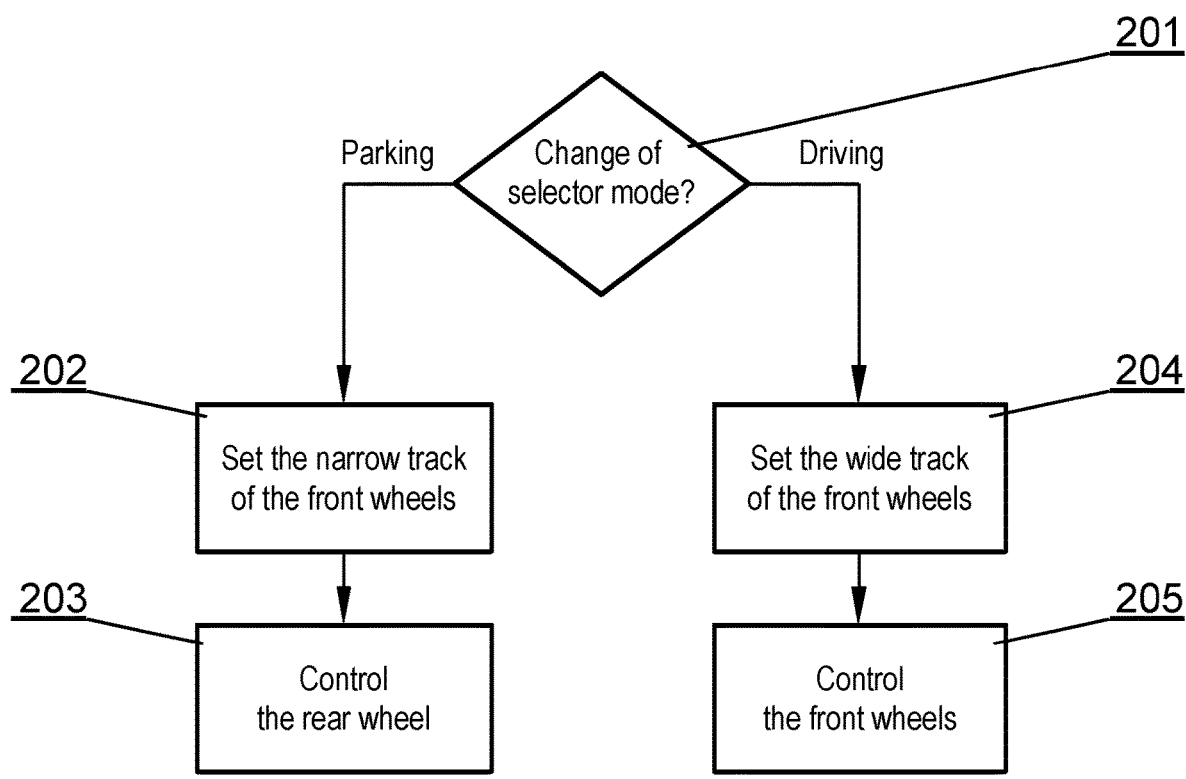
FIG. 9 shows a flow diagram of operation of the selector, in accordance with an embodiment of the invention.

FIG. 9 shows a flow diagram of operation of the selector. The operation may be controlled mechanically or electrically by a central processing unit of the vehicle. When in step 201 a change of selector mode to the "parking mode" is detected, the track width control means are activated to in step 202 set the narrow track of the front wheels 111, 112 and next in step 203 the steering means are configured to control the turn of the rear wheel 121. In turn, when in step 201 a change of selector mode to the "driving mode" is detected, the track width control means are activated in step 204 to set the wide track of the front wheels 111, 112 and next in step 205 the steering means are configured to control the turn of the front wheels 111, 112 and/or of the rear wheel 121.

All the embodiments of the chassis of the vehicle as described above can be coupled with a tiltable frame, for example such as described in the PCT patent application WO2011144574, which publication is incorporated by reference in its entirety.

The embodiments presented above are non-limiting embodiments illustrative of the invention. Various modifications can be made without departing from the scope of the invention, which is defined by the attached claims. For example, the rear axle may comprise more than one wheel, provided that the track width of the rear wheels is not wider than the narrow track of the front wheels. The vehicle may also comprise more than two axles.

What is claimed is:

1. A vehicle comprising:
   (a) A front axle with a pair of front wheels having a track width adjustable between a wide track and a narrow track;
   (b) A rear axle with a rear wheel;
   (c) Steering means configured to control the turn of the rear wheel when the front wheels are set to the narrow track;

(d) Track width control means configured to change the track width of the front wheels and to change the wheelbase between the front axle and the rear axle such that for the wide track of the front wheels the wheel base is longer than for the narrow track of the front wheels;

(e) A locking mechanism configured to lock the track width;

(f) Wherein each of the front wheels is connected to a dedicated front wheel motor for driving that front wheel and to a dedicated front wheel brake for braking that front wheel; and (g) Wherein the track width control means are configured to change the track width of the front wheels by controlling the front wheel motors and the front wheel brakes such that when the locking mechanism is not locked the front wheel motors that drive the front wheels are configured to increase the track width and the front wheel brakes that brake the front wheels are configured to decrease the track width.

2. The vehicle according to claim 1, wherein the front wheel motors are electric motors.

3. The vehicle according to claim 1, wherein the front wheel motors are integrated with the front wheel brakes.

4. The vehicle according to claim 1, wherein the front wheel motors are integrated with the front axles.

5. The vehicle according to claim 1, wherein the rear wheel is driven by a rear wheel motor.

6. The vehicle according to claim 5, wherein the rear wheel motor has a higher power than each of the front wheel motors.

7. The vehicle according to claim 1, wherein the locking mechanism is movable and configured to lock at predefined locking points which are fixed with respect to the vehicle chassis.

8. The vehicle according to claim 1, wherein the locking mechanism comprises a latch configured to be coupled with pins.

9. The vehicle according to claim 1, wherein the locking mechanism comprises a pin configured to be coupled with latches.

10. The vehicle according to claim 1, wherein the locking mechanism comprises a magnetic element configured to be coupled with electromagnets.

11. The vehicle according to claim 1, wherein the locking mechanism is fixed with respect to the vehicle chassis and configured to lock a pair of pivotable wishbones.

12. A method for changing track width of front wheels in a vehicle, the vehicle comprising:

a front axle with a pair of front wheels having a track width adjustable between a wide track and a narrow track;

a rear axle with a rear wheel;

steering means configured to control the turn of the rear wheel when the front wheels are set to the narrow track;

track width control means configured to change the track width of the front wheels and to change the wheel base between the front axle and the rear axle such that for the wide track of the front wheels the wheel base is longer than for the narrow track of the front wheels;

a locking mechanism configured to lock the track width;

wherein each of the front wheels is connected to a dedicated front wheel motor for driving that front wheel to a dedicated front wheel brake for braking that front wheel;

wherein the method comprises controlling the front wheel motors and the front wheel brakes to change the track width of the front wheels, such that when the locking mechanism is not locked the front wheel motors that drive the front wheels are configured to increase the track width and the front wheel brakes that brake the front wheels are configured to decrease the track width.

* * * * *